REDUNDANCY-ELIMINATION SYSTEM FOR TRANSMITTING EACH SAMPLE ONLY IF IT DIFFERS FROM PREVIOUSLY TRANSMITTED SAMPLE BY PREDETERMINED AMOUNT

Filed Oct. 15, 1965 5 Sheets-Sheet 1

INVENTORS
SPYROS G. VARSOS
WILLAM T. DOUGLAS, JR
Julian C. Renfro
ATTOR.

INVENTORS
SPYROS G. VARSOS
WILLIAM T. DOUGLASS JR
Julian C. Renfro
ATTOR.

INVENTORS
SPYROS G. VARSOS
WILLIAM T. DOUGLASS, JR
Julian C. Renfro
ATTOR.

REDUNDANCY-ELIMINATION SYSTEM FOR TRANSMITTING EACH SAMPLE ONLY IF IT DIFFERS FROM PREVIOUSLY TRANSMITTED SAMPLE BY PREDETERMINED AMOUNT

Filed Oct. 15, 1965 5 Sheets-Sheet 4

INVENTORS
SPYROS G. VARSOS
WILLIAM T. DOUGLASS JR
Julian C. Renfro
ATTOR.

INVENTORS
SPYROS G. VARSOS
WILLIAM T. DOUGLASS JR
Julian C. Renfro
ATTOR.

United States Patent Office 3,378,641

Patented Apr. 16, 1968

3,378,641

REDUNDANCY-ELIMINATION SYSTEM FOR TRANSMITTING EACH SAMPLE ONLY IF IT DIFFERS FROM PREVIOUSLY TRANSMITTED SAMPLE BY PRE-DETERMINED AMOUNT

Spyros G. Varsos, Maitland, and William Taylor Douglas, Jr., Winter Park, Fla., assignors to Martin-Marietta Corporation, Middle River, Md., a corporation of Maryland Filed Oct. 15, 1965, Ser. No. 496,495
19 Claims. (Cl. 179—15.55)

This invention relates to a pulse communication system, and more particularly to a communication system wherein power is conserved by reducing the number of pulses required for the transmission of information. This result is achieved by means of an adaptive voice-operated switch for selectively blocking the transmission of redundant portions of an information-bearing signal, thereby transmitting a signal representing a particular information sample if—and only if—the sample indicates a significant change from a previous information sample.

The invention is particularly useful in battery-operated pulse communication systems for the transmission of both voice and numerical-data information. In such systems—which may be intended for use in spacecraft, manned portable equipment, or other environments in which weight reduction is a significant consideration—a decrease in power requirement is extremely desirable, since it may be directly translated into reductions in power-supply size. Additional desirable results of the present invention include the possibility of reduction of bandwidth requirements due to decreased pulse density and decrease in cross-talk effects in multiple-channel communication systems.

Pulse communication systems are often more desirable than frequency- or amplitude-modulated carrier-wave systems, because of reduced power-supply requirements and because of convenient adaptability for multiplex communication—i.e., transmission of a large number of messages in a time- and/or frequency-sharing mode. Multiplex systems usually permit information to be transmitted in a narrower overall bandwidth than would be required if the communication channels were not multiplexed. In addition, for military communication, pulse techniques are highly desirable because they may be readily adapted for message scrambling, etc. to insure secrecy of communication. Application of techniques of the present invention to pulse communication enhances the already desirable features thereof.

There are two basic techniques for encoding information used in pulse communications; namely, analog coding and digital coding. Analog codes are those which are derived by periodically sampling the input information and converting it into a code signal which is one member of an infinitely large set. Examples of such analog codes are found in pulse-position modulation systems, pulse-width modulation systems, pulse-amplitude modulation systems, etc.

In contrast, a digital code is one that is derived by periodically sampling the input information, and converting the sample into a coded signal which is a member of a finite set. Such coding is typically accomplished either by quantizing the sampled information or by encoding the samples directly in quantized form. Examples of such digital codes include quantized pulse-position modulation, pulse-code modulation, etc.

Of the analog codes, pulse-position modulation (PPM) possesses a number of highly desirable features. In PPM systems, the time between successive samples of the information to be transmitted includes what is called a "deviation period." During the deviation period, a single pulse is transmitted. The position of the pulse relative to the beginning of the deviation period, is representative of the amplitude of the information signal at the time of the most recent sample. It may be readily seen that such systems are attractive from the point of view of relatively low pulse density in the transmitted message, which may considerably reduce the output power requirements of the transmitting equipment, and also minimize cross-talk and interference between adjacent channels in a multi-channel system.

A number of techniques have been employed in connection with PPM systems to decrease the effect of noise and cross-talk interference, especially when a relatively large deviation period is used. For example, in the U.S. patent application of Spyros G. Varsos entitled "Pulse Selecting Device," Ser. No. 348,210, filed Feb. 28, 1964, and assigned to the assignee of the present invention, there is disclosed a PPM receiver designed to detect errors caused by cross-talk and spurious noise signals (so-called commissive errors) and those errors caused by the absence of an appropriate signal within each deviation period (so-called omissive errors). In this system, the absence of an appropriate signal within each deviation period results in the generation by the receiver of a signal for that deviation period equal in amplitude to the signal which was received during the immediately previous deviation period. Where more than one pulse is received within a particular deviation period, the information represented by each of such pulses is successively compared with the information value received during the immediately previous deviation period, and the signal closest in amplitude to that previously received is selected as the appropriate value during that time period.

Another approach toward improving noise rejection, and at the same time conserving power, in PPM systems has involved the use of the so-called voice-operated switch. One example of the voice-operated switch is that shown in U.S. Patent No. 3,161,829 to Charles H. Schulman, entitled, "Modulation Operated Switch," dated Dec. 15, 1964, and assigned to the assignee of the present invention. According to the Schulman patent, PPM pulses are transmitted only during periods that voice energy is present but not otherwise. The Schulman invention may even be used in applications where extremely rapid operation of the switch is necessary, but it is not intended to reduce redundancies in the transmission of sampled speech.

An alternative technique is shown in U.S. Patent No. 3,153,196, entitled "Optimum Coding Technique," granted to Hubert E. McGuire and assigned to the assignee of the present invention. The technique of the McGuire patent is based upon the principle of "center pulse blanking." This technique has proven to be a very effective method of providing transmitter blanking of pulses during short pauses and breaks in speech regardless of the rapidity of the speech, the length of pulses, or the dynamic range of amplitudes in the spoken message. However, the center-pulse-blanking technique results in the elimination of samples which occur at zero crossings of the speech waveform, and this may be somewhat undesirable where optimum speech fidelity is to be maintained. In addition, the center-pulse-blanking technique has proven to be incompatible with a PPM receiver operating on a principle such as is disclosed in the Varsos application Ser. No. 348,210, mentioned above, since the absence of a pulse signal within a particular deviation period in the McGuire system is representative of a zero amplitude of the speech signal. In contrast, the absence of a pulse is interpreted by the Varsos receiver as an error, which is corrected therein upon the assumption that the message signal would not have changed by a significant amount from one pulse period to the next.

Among so-called digital coding techniques, one of the more desirable approaches is that of pulse-code modulation (PCM). Here the sampled information is quantized and each quantized sample is converted into a sequence of pulse codes representative of that quantization level. For example, if a coding set including 32 members is to be used, each quantized sample is converted into five information bits. Compared to PPM systems, PCM systems are far less sensitive to noise; however, because of quantizing noise, the system resolution is inherently lower. In addition, typical pulse-code modulation systems for use in voice communication require a channel capacity of approximately 32,000 bits per second for each channel, while comparable pulse-position modulation systems require only approximately 8,000 bits per second.

A different approach to the improvement of pulse communication systems involves a recognition that few if any messages are completely random, and therefore it is possible to eliminate from any given message a certain amount of redundant information. For example, it is known that if all redundant information is removed from a typical voice signal, then a channel having a bandwidth of approximately 50 cycles per second would be sufficient to transmit enough information to fully characterize the voice signal and to allow its reconstruction by the receiver. In the case of pulse communication systems, the elimination of redundant information may have a number of advantageous effects. First, elimination of redundant information can result in a decrease in the number of pulses which must be transmitted for a given message. As previously indicated, this is desirable because of decreased transmitter power, and because of resulting reduction in cross-talk between channels in a multi-channel communication system.

In some instances, bandwidth reduction may also be possible as a by-product of the reduction in pulse density. One system in which this result is achieved is described in the U.S. patent application of Spyros G. Varsos entitled "Adaptive Pulse Transmission System," Ser. No. 291,809, filed July 1, 1963, which is now Patent No. 3,339,-142, assigned to the assignee of the present invention. It should be noted, however, that the shape of the pulse, the instantaneous pulse rate, and other system parameters determine the bandwidth requirements—rather than the average pulse rate.

An alternative advantage that may be attained by decreasing the natural redundancy of the information message itself, results from the fact that a controlled redundancy of some type may be employed to render a message far less susceptible to the effects of a noisy channel than a naturally redundant message. Based on this principle, codes have been devised which are in themselves highly redundant so as to decrease the probability that the received message will contain errors. The simplest examples of such redundant codes are digital codes of various kinds to which are added so-called parity bits, the values of which (1 or 0) are chosen to make the binary value of the coded message either always odd or always even. Other highly complex codes have been devised whereby it is possible not only to detect the presence of the error in the received message but, if the code is sufficiently redundant, to properly correct the error as well.

Thus, the smaller the amount of information that must be transmitted to fully characterize the message, the larger is the amount of error-detection or correction information that can be included in the transmitted message for a channel of a given bandwidth. Accordingly, if a substantial portion of the redundant information can be removed from a message signal, it will be possible to materially improve the performance of the communication system having limited channel bandwith.

Thus a compromise may be achieved between the quality of the information received (which would be improved by use of a highly redundant code and a substantially non-redundant message but would require a high pulse density and wide-bandwidth communication channel) and the requirements of low cross-talk and inter-channel interferene as well as narrower bandwidth requirements (which result may be best achieved by the use of low pulse density codes carrying little or no redundant information).

In analog systems such as the type shown in the previously mentioned Varsos application Ser. No. 348,210, there is provided error-detection and correction means for analog coding schemes; however, it is also desirable to provide means whereby redundancies in the information message could be eliminated before transmission, as generally discussed above.

The voice-operated switch principle would appear to be readily adaptable to this purpose. However, previously available techniques have not proven successful and, in addition, are incompatible with error-detection systems such as that shown in the Varsos application.

It has alternatively been suggested that the information waveform be sampled and that successive samples be compared for the purpose of eliminating from the transmitted message any samples which do not differ sufficiently from the immediately preceding samples. A PPM system of this type would have the advantage of compatibility with an error-correcting receiver of the type described in the Varsos application, as well as the capability of substantial reduction in the degree of redundancy in the voice message. In addition, it would be readily adaptable to digital coding. Unfortunately, previous attempts to provide such a system empolying active delay multivibrators have proved unsuccessful because of the inherent instability of the active circuits. The use of passive delay lines of mechanical or electro-mechanical structure has also proven not to be feasible, because of unreasonable size, weight, and cost of lines having a sufficient delay period.

Accordingly, it is an object of this invention to provide an improved technique for pulse communication. It is a related object to provide an improved communication technique which is useful with both digital and analog coding schemes.

It is a further object of this invention to provide a technique for the elimination of redundancy in a coded message waveform. It is a related object of this invention to provide a redundancy-elimination scheme whereby less information may be transmitted for a given bandwidth, so that a redundant code may be employed to assure error-free transmission. It is an alternative object to provide a redundancy-elimination scheme whereby a given information-bearing message may be transmitted within a narrow frequency spectrum, so as to conserve bandwidth and to reduce the effect of cross-talk on adjacent channels in a multiple-channel communication system. It is an additional object of this invention to provide a redundancy-elimination system which is compatible with pulse-position modulation receivers of the error-correcting type.

It is also an object of this invention to provide an improved instantaneous voice-operated switch. It is a related object of this invention to provide an instantaneous voice-operated switch having adaptive characteristics whereby a portion of a given information waveform may be selected for transmission to a receiver only if it differs sufficiently from portions previously transmitted.

It is an additional object of this invention to provide a communication system employing an instantaneous adaptive voice-operated switch whereby successive samples of the information waveform are compared with previously transmitted samples, and such successive samples are transmitted only if they differ by a predetermined amount from such previously transmitted samples.

The above-enumerated objects are attained in the present invention by use of a system which includes a periodic sampler for the data to be transmitted, and storage and comparison equipment to compare the amplitude of the most recent sample with the amplitude of the sample most recently transmitted. Accordaing to this invention, transmission of pulses is blocked during any particular sampling period if the amplitude of the previously transmitted sample does not differ sufficiently from the most recent sample. For analog pulse coding, the difference between successive samples is compared with a predetermined difference level chosen in accordance with the degree of redundancy which is to be eliminated. For digital coding, two successive samples may be compared in coded or uncoded form, and the transmitter inhibited if two successive samples are within a predetermined number of quantizing levels of each other.

The exact nature of this invention, as well as other objects and advantages thereof, will be readily apparent from consideration of the following specification relating to the annexed drawings in which.

Figure 1:
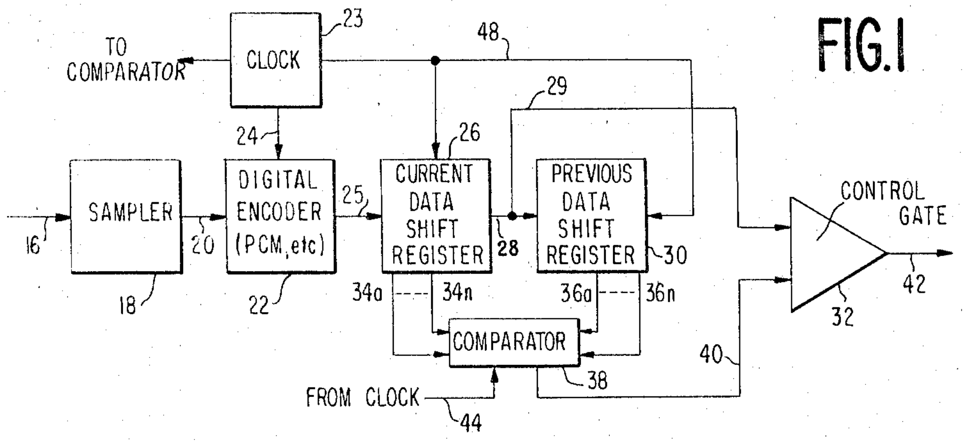
FIGURE 1 is a block digram of one embodiment of this invention adapted for use with digital coding techniques.

Referring now to FIGURE 1, there is shown a simplified embodiment of this invention employing digital coding techniques. Suitable voice or other message signals are provided over signal path 16 to a suitable sampler 18, and thence over signal channel 20 to a digital encoder 22. The encoder may be of any suitable type, such as pulse-code modulation, etc. Encoder 22 may include means responsive to a signal generated by a clock 23 and provided over a signal path 24, to cause the encoded message provided over signal path 25 to be in the form of code words corresponding to the instantaneous value of the waveform appearing in channel 16 at the instant of each sample.

Responsive to the clock signals, each of the code words appearing in signal path 25 are stored in a current-data memory 26, which may comprise a shift register of sufficient length to accept an entire code word.

Again, in response to the clock signals, the data stored in memory 26 is shifted out along signal path 28 and is stored in a second memory circuit 30, the contents of which represent the value of the information in channel 16 at the time of the secondmost-recent pulse—i.e., the pulse immediately preceding the most recent pulse.

The information appearing on signal path 28 is also provided over signal path 29 to a control gate 32 which may be an AND gate of well-known configuration.

Each of the bit positions in memory circuits 26 and 30 is provided, through a number of circuits—**34*a*–34*n* and 36*a*–36*n*, respectively—to a bit-by-bit comparator 38 which functions to compare the two incoming waveforms and to generate a signal appearing on line 40** whenever the two waveforms are different.

Thus it may be seen that if the data in memory 26 (which corresponds to the most recent sample of the input waveform) differs from the information stored in memory 30 (which corresponds to the second-most-recent sample of the incoming waveform), then control gate 32 will be enabled by a signal over lead 40. Therefore, in response to the clock signals provided over lead 44, the information being transferred to memory 30 will also be provided through control gate 32 to output channel 42. Channel 42 may be connected to any suitable transmitter (not shown) whereby the message samples which differ from previous samples are transmitted.

Figure 2:
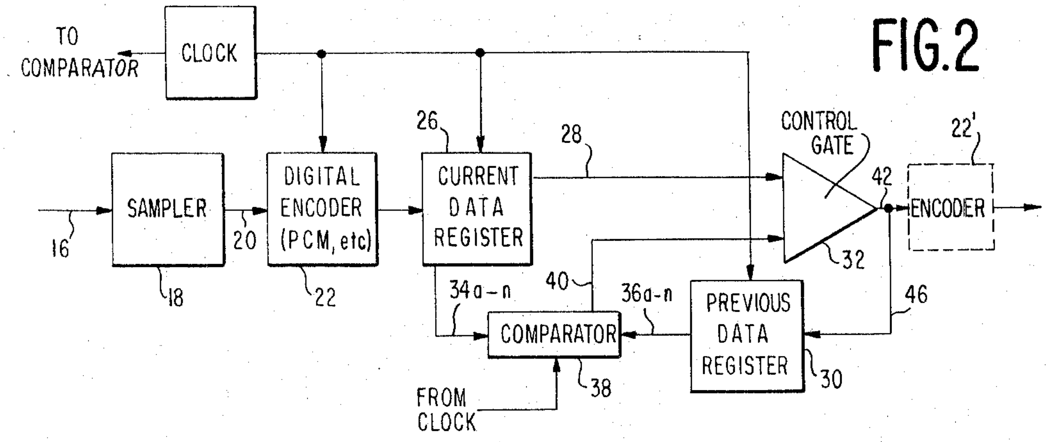
FIGURE 2 is a block diagram of a modified version of FIGURE 1.

In FIGURE 2 there is shown a modification of the digital communication system of FIGURE 1 wherein the information stored in memory 30 is representative not of the second-most-recent sample but, rather, of the most recently transmitted sample. This feature is desirable since it is possible, for example, that of three successive samples, the first and second samples may not differ from each other sufficiently to cause both to be transmitted, and, in addition, the second and third samples may not differ sufficiently to cause the third to be transmitted. However, it may well be that the first and third samples do in fact differ by a considerable amount, and, in order to preserve the fidelity of the message, both should be transmitted.

Accordingly, in FIGURE 2, the output of memory circuit 26 is provided directly over lead 28 to the control gate 32, and the output of the control gate is provided over circuit path 46 to the input of memory circuit 30. Thus, if a comparison of the information stored in memory 30 with that stored in memory 26 indicates a sufficient difference to cause an enabling signal to appear on lead 40, control gate 32 will then be activated and the current data from memory 26 will be pulsed out along line 42 to the transmitter, and simultaneously will be provided on signal path 46 to memory circuit 30. In this manner, the information stored in memory 30 is at all times representative of the last code word which has been transmitted, so that small changes between successive samples will not mask the fact that there has been an overall large change in the level of the information signal.

Comparator circuit 38 in FIGURES 1 and 2 may be arranged so as to respond with an output along lead 40 whenever there is a one-bit difference between the words stored in memory circuits 26 and 30. Alternatively, the comparator may be arranged so that a difference of more than one bit is necessary to cause the transmission of a new sample. As the amount of difference between the previously transmitted sample and the present sample that is necessary to cause a new transmission is increased, it may be seen that fewer and fewer samples will be transmitted corresponding to larger differences. For voice messages, however, it is found that an extremely large difference level cannot be tolerated or the reception of the message will be so degraded that its reconstruction is impossible. This corresponds to a situation in which useful information is being thrown away. It has been found, from experience, that a difference level of approximately 5% or less of the maximum range of input waveform levels will permit the transmission of a message which can be readily reconstructed at the receiver.

In connection with the digital embodiments of FIGURES 1 and 2, it should be noted that redundancy is simply eliminated from the messages without any corresponding addition of error-detection or correction information to the transmitted code. If the latter result is desired, it may be readily achieved by adding an encoder 22', shown in outline in FIGURE 2. Therefore, if a channel is available whose bandwidth exceeds the requirements of the signal appearing at the input of encoder 22', error-detection and correction information may be added to the coded message, thereby utilizing the channel fully to improve the accuracy of reception.

Figure 3:
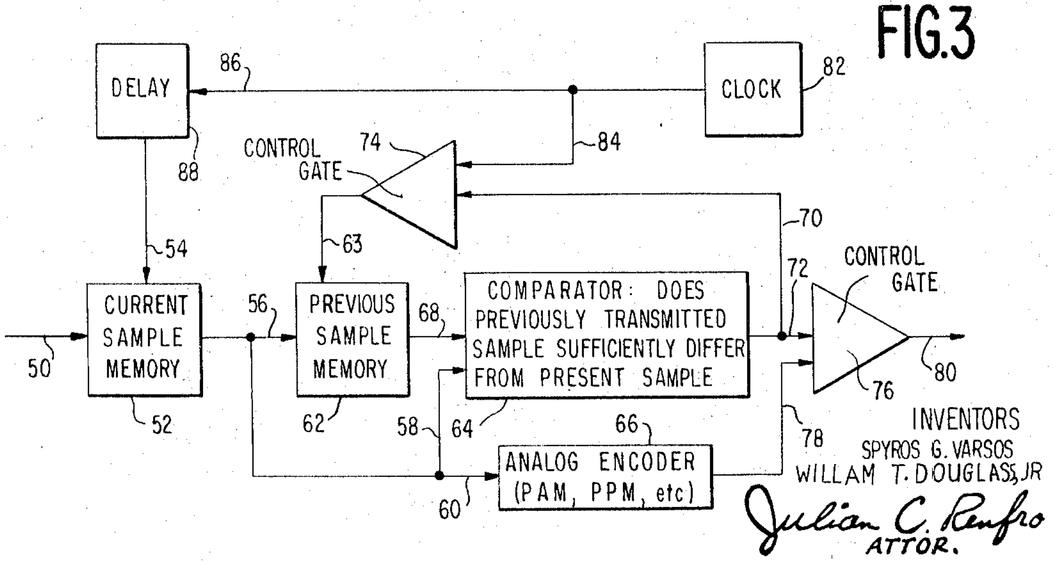
FIGURE 3 is a block diagram showing the general configuration of an embodiment of this invention similar to that of FIGURE 2 employing analog, rather than digital, coding techniques.

Turning now to FIGURE 3, there is shown a basic block diagram of the concepts of this invention as embodied in a pulse communication system of the analog code type. Here, the voice or data information to be transmitted is provided over a signal path 50 to a memory circuit 52. Periodic sampling pulses provided over lead 54 cause memory 52 to periodically sample and store the instantaneous value of the incoming waveform. These sampled values are provided over paths 56, 58 and 60 to a second memory circuit 62, to a comparator circuit 64 and to an analog encoder 66, respectively.

Analog encoder 66 may be of any suitable type; for example, pulse-amplitude modulation, pulse-position modulation, pulse-width modulation, etc., as may be readily understood.

The second memory circuit 62 provides means to store the value of the most recently transmitted sample. As previously explained, it is desirable that the informaiton stored in circuit 62 correspond to the most recently transmitted data rather than the immediately previous sample, since successive samples may change by a very small amount, thereby masking larger, long-term changes. Accordingly, the sampling signal applied to memory circuit 62 over path 63 is provided only during those sampling periods in which information is to be transmitted.

In order to determine whether to transmit a particular sample, the signals stored in memories 52 and 62 are provided over leads 58 and 68, respectively, to the comparator circuit 64. Comparator 64, which may be of any suitable type, compares the present data with the previously transmitted data in order to determine whether they differ sufficiently to warrant the transmission of the more recent data. As in the embodiments of FIGURES 1 and 2, means may be provided within comparator 64 to provide a difference level which must be exceeded before the information is to be transmitted.

Comparator circuit 64 provides a control signal over leads 70 and 72 to initiate the transmission of new information and to cause memory 62 to be updated. Accordingly, there are provided control gates 74 and 76, which may take the form of the well-known AND gate. For example, upon determination by comparator 64 that a particular sample should be transmitted, control signals are provided over leads 70 and 72, whereby signals appearing on leads 84 and 78 are passed through control gates 74 and 76, respectively.

Assuming that a control signal is present on lead 72, it may then be seen that the current sample provided over lead 60 to the analog encoder 66 and encoded thereby, will be provided to the transmitter over circuit path 80 through the enabled control gate 76 and circuit path 78.

A suitable block 82 provides synchronization and sampling signals for the system. Each clock signal is provided over leads 84 and 86 to control gate 74 and delay circuit 88, respectively. If a control signal is provided over lead 70, then a sampling signal on lead 84 will be passed to lead 63, whereupon the signal level stored in the memory circuit 52 will be stored in memory 62. Since a signal on lead 70 is simultaneously present with the signal on lead 72, it may be seen that the encoded value of the sample being stored in memory 62 is also being passed through control gate 76 to the transmitter. Thus, memory 62 is provided with the most recently transmitted data sample.

The sampling signal provided to gate 74 over lead 84 is also provided over lead 86 to a delay element 88 and thence over lead 54 to sampler 52. Responsive to a signal over circuit 54, memory circuit 52 accepts the then current value of the input signal in channel 50, whereupon a new sample may be compared with the previously transmitted sample. The length of delay 88 is chosen to be quite small, and is provided to allow sufficient time for the transfer of information from memory 52 to memory 62 in response to a sampling pulse over lead 63.

Of course, it may be recognized that in the absence of an enabling signal 70, which is indicative of an insufficient difference between the present sample and the most recently transmitted sample, the sampling signal provided over lead 84 will not be transmitted to memory 62. However, after the small delay introduced by circuit 88, a new sample is provided to memory circuit 52, even though the signal in memory 62 has not changed.

Figures 4, 11:
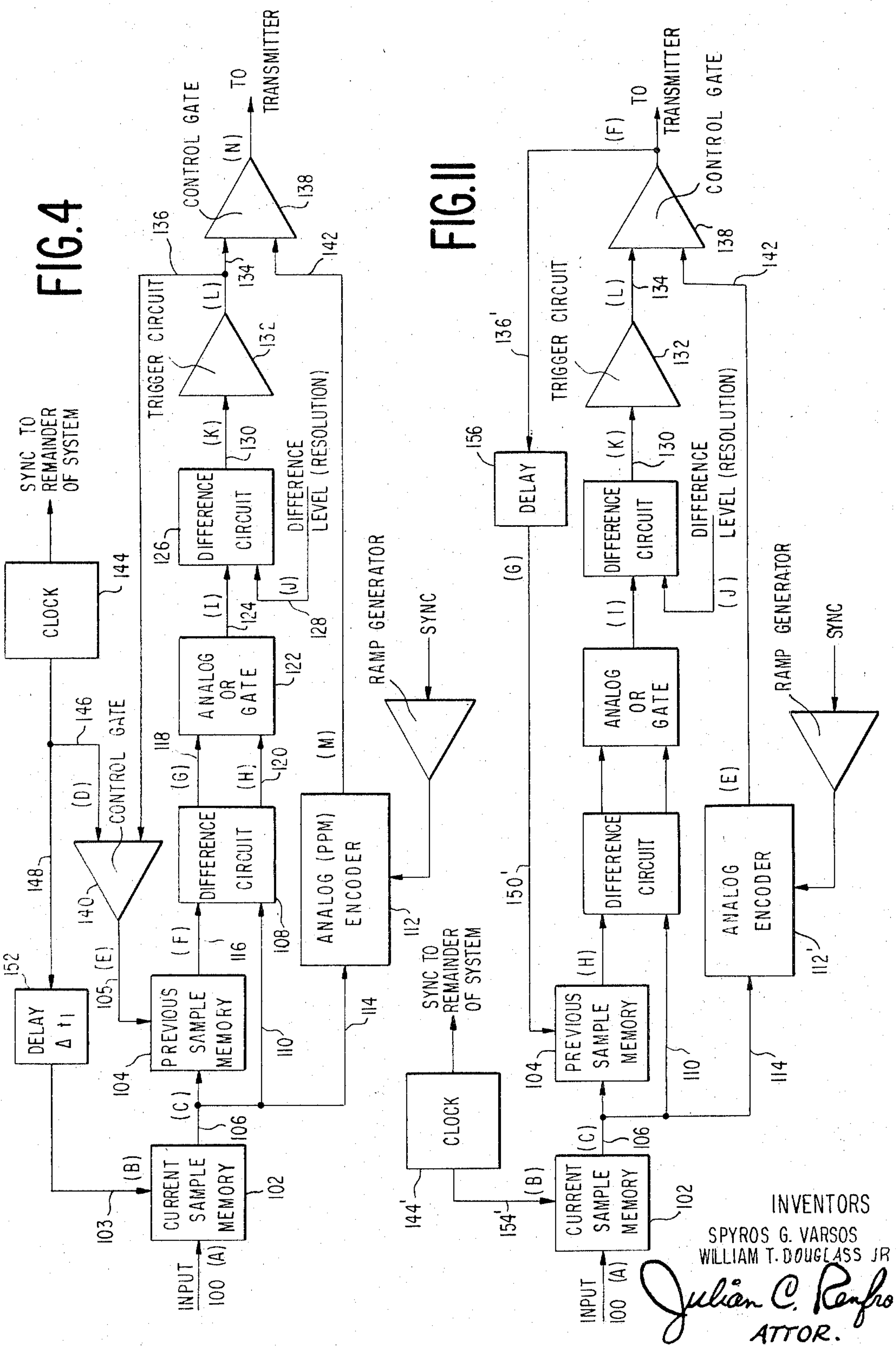
FIGURE 4 is a detailed block diagram showing the construction of an embodiment of this invention similar to that of FIGURE 3 employing pulse-position modulation for the encoding of the information to be transmitted.
FIGURE 11 is a block diagram showing a modification of the embodiment of FIGURE 4.
Figure 5:
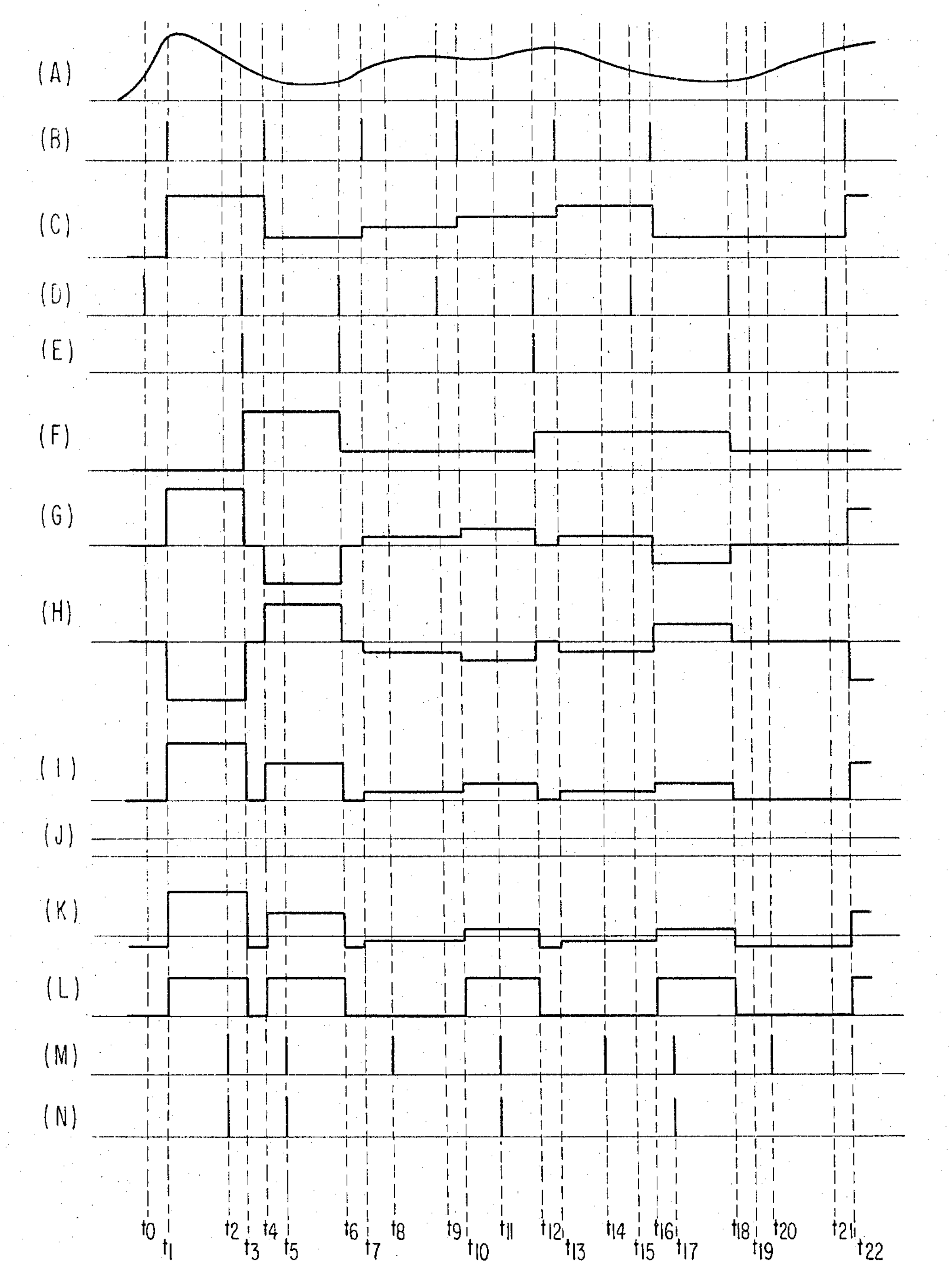
FIGURE 5 is a diagram of waveforms appearing in various points of the system depicted in FIGURE 4.

Referring now to FIGURES 4 and 5, a more detailed explanation of the operation of an analog pulse communication system according to this invention, as well as a more detailed description of a preferred embodiment thereof, will be provided.

In the system of FIGURE 4, the information-bearing waveform is provided over signal path 100 to a memory circuit 102 which responds to clock pulses over lead 103 to periodically sample and store the value of the incoming waveform. Memory circuit 102 is connected by signal path 106 to a second memory circuit 104, to a different amplifier 108 over signal path 110, and to a PPM or other analog encoder 112 over signal path 114. Memory circuit 104 responds to a signal over lead 105 to sample and store the value of the signal in memory 102 during those time periods in which such information differs sufficiently from previously transmitted information to warrant its transmission. Accordingly, the information stored in memory 104 at all times represents the value of the last information sample which was transmitted.

Difference circuit 108 provides two output signals. A first signal appearing on lead 118 is representative of the difference between the current sample provided over path 110 and the previously transmitted sample provided over lead 116. On the other hand, the signal appearing on lead 120 is inverted from that appearing on lead 118; i.e., it is equal to the difference between the previously transmitted sample and the present sample.

Signal paths 118 and 120 are connected to an analog OR gate 122 which provides an output signal over lead 124 equal to the largest of the two input signals. Signal lead 124 is connected to a second difference circuit 126 which has provided, as a second input over lead 128, a signal representative of the minimum difference between successive pulses to which the system is to respond. Circuit 126 provides an output over lead 130 representative of the difference between the signals appearing on leads 124 and 128. A trigger circuit 132 is connected to lead 130 and provides a positive output pulse on leads 134 and 136 when the signal on lead 130 is positive, but produces a zero output in response to a zero or negative input. The signals appearing on leads 134 and 136 are provided to a pair of control gates 138 and 140, respectively, and serve as enabling signals for the gates.

A second input to control gate 138 is provided over circuit 142 from PPM encoder 112. As may be understood, the presence of an enabling signal on lead 134 results in the transmission through control gate 138 of the signal appearing on lead 142. Similarly, a suitable clock signal generator 144 provides timing signals for the system over leads 146 and 148. The timing signal appearing on lead 146 passes through control gate 140 in response to an enabling signal over lead 136, and is provided to memory circuit 104 over lead 105 to effect a storage of the signal level appearing at the time of the sampling pulse in signal path 106. Similarly, the sampling signal is provided over path 148 to a delay circuit 152 and then over path 103 to memory circuit 102, whereby a new value of the incoming data may be sampled and stored.

Referring now to FIGURE 5, each of the waveforms therein is appropriately labeled A through N to correspond with similar labels in FIGURE 4 indicating the points in the circuit at which the various waveforms appear. As will be understood, the sampling rate is determined by clock circuit 144, which is chosen in accordance with the sampling theorem to be at least twice the highest information frequency. Accordingly, the input signal appearing at A will be successively sample at twice the highest frequency contained therein and the instantaneous value of each sample will be stored in circuit 102 (see waveform C). Specifically, a clock signal is generated at time $t_0$ (waveform D). At a time $t_1$ later, the delay being sufficient to provide complete transfer of the information from the memory circuit 102 to memory circuit 104, the instantaneous value of the A waveform is stored in memory 102.

Assuming that up to time $t_1$ the value of the signal stored in memory 104 is zero (see waveform F), then the waveforms G and H (which represent plus and minus the difference between waveforms C and F, respectively) will simply be plus and minus the current value of waveform C.

Gating circuit 122, which operates to select the largest of the signals appearing on leads 118 and 120, picks the positive one of the two input signals—at this time, waveform G (see waveform I). The output of OR gate 122 (I) is provided to difference circuit 126, which also receives the signal J appearing on lead 128. As shown in FIGURE 4, signal J assumes a constant value during all times of interest; however, it should be understood that the value of waveform J could be varied in accordance with the desired resolution of the system. In fact, it could also prove desirable to adjust the value of waveform J during the transmission of information in accordance with one or more characteristics of the information, such as its rate of change, etc.

Waveform J is subtracted from waveform I by means of the difference circuit 126, and the result thereof appears as waveform K. Waveform K is provided to a suitable Schmitt trigger circuit, or like device, which will provide a signal of constant amplitude in response to a positive input signal (see waveform L). This latter is the enabling signal which is provided to control gates 138 and 140 to determine whether information is to be transmitted and whether new information is to be stored in memory circuit 104. Specifically, since the difference between the signals stored in memories 102 and 104 is greater than the threshold value determined by waveform J, it is desired to transmit the information sample taken at time $t_1$ and to update the transmitted sample storage. Thus, it may be seen that, shortly after time $t_1$ (the delay being due to the dynamics of Schmitt trigger circuit 132), an enabling signal appears on leads 134 and 136. At time $t_2$, an output signal is provided at point M by the PPM encoder 112. As will be explained subsequently, the position of the output waveform M relative to the immediately previous pulse of waveform B is determined by the amplitude of the signal appearing at point C. As shown by waveform N, the coincidence of signals L and M produces an output pulse at time $t_2$ for transmission to the receiver.

At time $t_3$, a new sampling pulse is provided by clock 144. The coincidence of the clock signal at time $t_3$ with the enabling waveform L, causes a signal to be provided over lead 105 whereby memory circuit 104 is operated to store the value of the signal of the waveform C at that time. Therefore, it may be seen that after time $t_3$ the value of the most recently transmitted sample (i.e., at time $t_2$) is stored in the memory circuit 104 and appears as waveform F.

At this time, waveforms C and F have the same value; therefore both waveforms G and H return to zero. Similarly, waveform I also returns to zero; and waveform K assumes a value equal to minus the value of waveform J. Schmitt trigger circuit 132, which provides a positive output only in response to a positive input, also goes to zero.

The signal appearing at time $t_3$ on lead 146 is also provided to delay circuit 152 and appears on lead 103 at time $t_4$. At this time, the new instantaneous value of waveform A is transferred to memory circuit 102, resulting in a corresponding change in the value of waveform C. Similarly, waveforms G and H now change in response to the new difference between waveforms F and C. Analog circuit 122 passes waveform H at this time rather than waveform G, because it has the positive value; and the waveform appearing at point K (equal to the difference between waveforms I and J) becomes positive; whereby an enabling signal again appears at point L, and at the appropriate time $t_5$ the pulse-position modulation signal M passes through gate 138.

At time $t_6$ another sampling pulse is generated by clock 144, which passes through enabled gate 140 to again update the information stored in sample-and-hold circuit 104. At time $t_7$ delay circuit 152 provides an output at point B, which causes a new value to be stored in memory circuit 102.

However, as may be seen in waveforms A and B, the value of waveform A has changed only slightly between times $t_4$ and $t_7$. In fact, as may be seen in waveforms G and H, the difference between the signal transmitted at time $t_5$—which corresponds to the amplitude of the input waveform at time $t_4$—(and now stored as waveform F) differs from the present value of waveform C by an amount less than the threshold indicated by waveform J. Accordingly, the output at point K assumes a negative value and Schmitt trigger 132 does not provide a positive output.

At time $t_8$, the code pulse representative of the amplitude of waveform A at time $t_7$ appears at point M, but, because the value of the enabling signal on lead 134 is zero, there is no corresponding pulse at point N for transmission to the receiver. Similarly, at time $t_9$, when the next sampling pulse is generated by clock 144, there is no change in the value of the signal stored in memory circuit 104. Accordingly, it may be seen that waveform F does not change, thereby assuring the storage in circuit 104 of only the most recently transmitted sample.

At time $t_{10}$ another sampling signal appears at point B, and the new value of waveform A is stored in circuit 102. As may be seen in waveform C, the value of waveform A at time $t_{10}$ differs from its value at time $t_7$ by less than the threshold amount indicated by waveform J; however, it does differ from the value at time $t_4$ by an amount which *is greater* than the threshold value of waveform J. Accordingly, there is now a sufficient difference between the last transmitted sample (corresponding to the value of waveform A at time $t_4$), and this value must be transmitted. The positive one of the waveforms G and H appears at point I for subtraction therefrom of waveform J, the result of which (waveform K), though small, is a positive signal. Trigger circuit 132 responds to this positive signal and provides a high level for waveform L which allows both the transmission at time $t_{11}$ of the encoded sample taken at time $t_{10}$ as well as the updating at time $t_{12}$ of memory circuit 104.

The value of waveform A at time $t_{13}$ may be seen to differ from its value at $t_{10}$ by less than the threshold amount. Accordingly, as described in connection with the waveforms appearing subsequent to time $t_7$, there will be no output at time $t_{14}$ corresponding to the value of waveform A at time $t_{13}$, nor will memory circuit 104 be updated during the next clock signal at time $t_{15}$. The next sample of waveform A taken at time $t_{16}$ indicates a sufficient change since that last transmitted at time $t_{10}$, and it is necessary that a new sample be transmitted at time $t_{17}$. Accordingly, as described previously, the appropriate difference waveforms appearing at points I and K result in the enabling of gates 138 and 140 after time $t_{16}$, whereby the coded pulse appearing at time $t_{17}$ is transmitted, and memory circuit 104 is updated at time $t_{18}$. Again, because the value of waveform A at time $t_{19}$ differs from its value at time $t_{16}$ by less than the threshold amount, trigger 132 is not enabled at time $t_{20}$ and no information is transmitted at that time, nor is memory circuit 104 updated at sample time $t_{21}$.

By reference to waveforms M and N, it may be seen that, during the times of interest, it has been possible to eliminate three out of a possible seven pulses which might have been transmitted.

As previously mentioned, the number of signals which may be eliminated from waveform N will depend on the value selected for the threshold level of waveform J. It may be readily understood that the higher the value of signal J, the more samples will be eliminated. A value of signal J of less than or equal to above five percent (5%) of the expected range of voice amplitudes, satisfies the requirement that the quality of the received speech be acceptable, or at least reconstructable.

Figure 6:
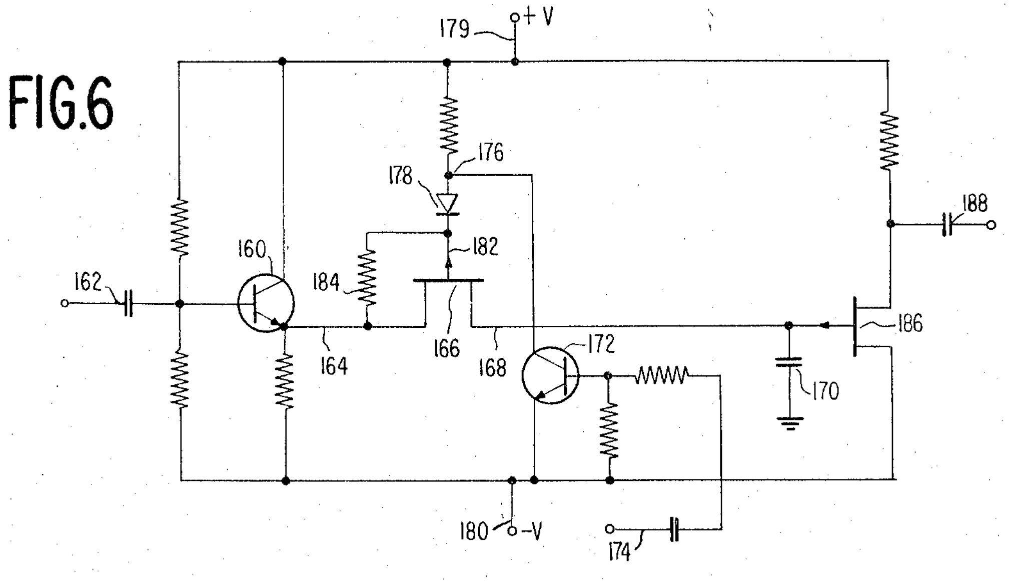
FIGURE 6 is a circuit diagram of a suitable memory circuit for use in the various analog encoder embodiments of this invention.

Referring now to FIGURE 6, there is shown a suitable sampling circuit which may comprise the memory circuits of the analog embodiments of this invention. The circuit is basically comprised of a driver stage, a fast-operating bilateral switch, a storage capacitor, and an extremely high input impedance isolation amplifier connecting the capacitor to the output terminal of the circuit.

The driver stage, comprised of transistor 160 and its associated bias and input circuitry, receives the input voice or data waveform at terminal 162 and reproduces it in suitably amplified form on lead 164 at the input of field-effect transistor 166 which serves as a bilateral sampling switch. In its conducting state, transistor 166 is capable of passing current in either direction between leads 164 and 168 so that the voltage on capacitor 170 will assume the value of the voltage appearing on lead 164 at the output of driver transistor 160.

The operation of the sampling transistor 166 is controlled by an NPN transistor 172 which serves as a switch. Sampling pulses provided to the base of transistor 172 by means of terminal 174 and the associated RC coupling network cause the transistor to be driven into its saturation condition, whereby the voltage at anode 176 of diode 178 assumes substantially the value of the negative voltage provided at terminal 180. The voltage on lead 164 will always be more positive than the negative supply voltage; and, therefore, when transistor 172 conducts, diode 178 becomes reverse biased. Since there is substantially no current flow through transistor 166 between leads 164 and 182, and because lead 182 is isolated from the negative voltage by diode 178, the voltage across resistor 184 will go to zero—permitting transistor 166 to conduct in either direction between leads 164 and 168, depending upon polarity of the voltage across transistor 166. Thus, voltage differences between the output of transistor 160 and capacitor 170 will rapidly disappear as the charge on the capacitor adjusts itself.

When the sampling pulse at terminal 174 is removed, transistor 172 is cut off, causing the voltage at anode 176 to increase—whereby diode 178 is rendered conductive. Accordingly, a voltage due to the positive voltage connected at terminal 179 appears on lead 182 and the value of the voltage across resistor 184 is no longer zero. At this time, the conduction path in transistor 166 is broken, and the charge provided to capacitor 170 during the sampling period is retained.

In order to assure such charge does not leak off between sampling pulses, a second field-effect transistor 186 is provided in an emitter-follower configuration to serve as a coupling amplifier between capacitor 170 and an output terminal 188. In this configuration, transistor 186 possesses an input impedance of approximately 100 megohms, which impedance effectively prevents charge leakage from the storage capacitor 170.

It should be recognized that other forms of sample-and-hold circuits may be employed in this invention instead of that shown in FIGURE 6, such as the so-called box-car circuit; however, the circuit of FIGURE 6 possesses a number of useful features. For example, in a typical box-car circuit it is necessary to return the storage element to zero voltage before the next sample can be stored. Accordingly, there would be provided a so-called dumping circuit and a triggering circuit for the dumping circuit. In addition, the waveform appearing at terminal 188 in FIGURE 6 contains considerably fewer frequency components than does a train of return-to-zero pulses such as would be provided by the typical box-car sampler circuit.

Figures 7, 8, 9:
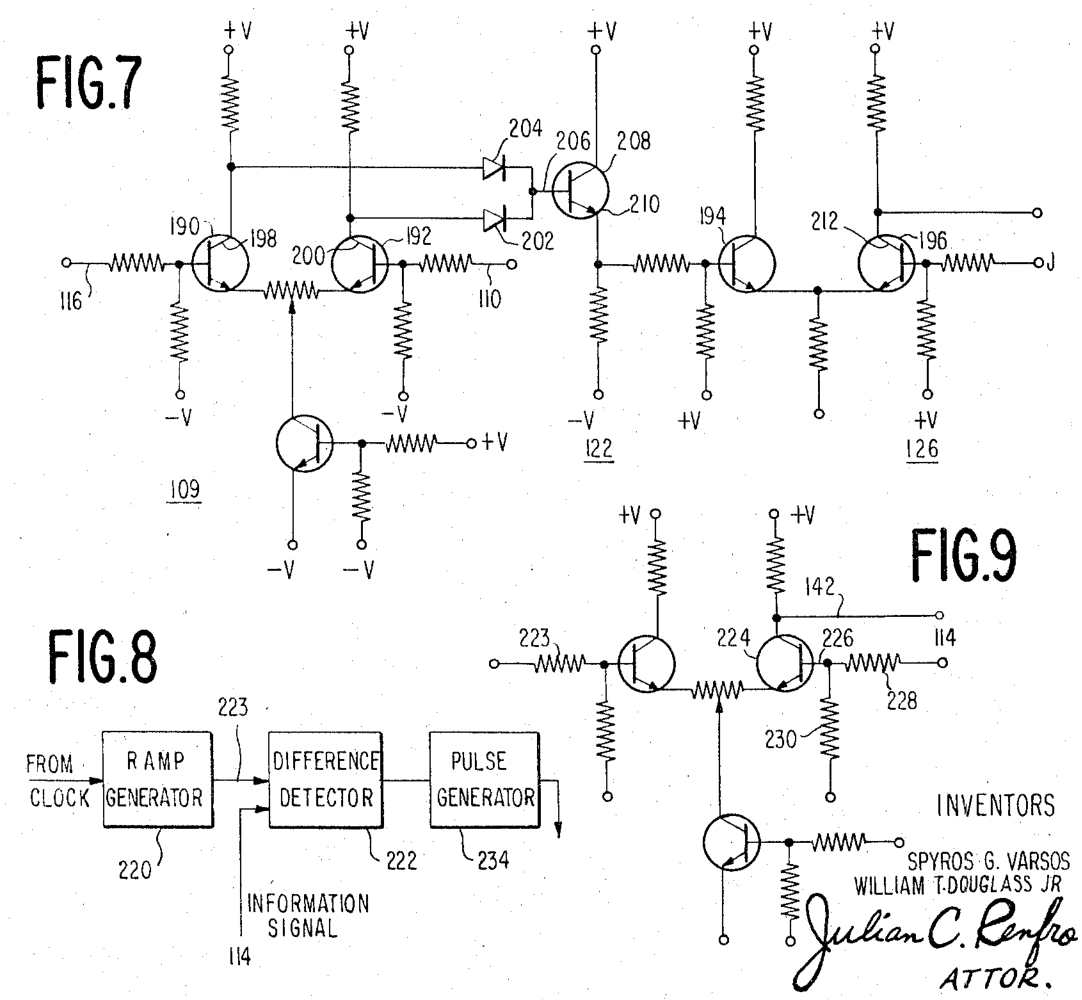
FIGURE 7 is a circuit diagram of a suitable comparator circuit for use with the analog embodiments of this invention.
FIGURE 8 is a block diagram showing the general configuration of pulse-position modulators which may be used with the analog embodiments of this invention.
FIGURE 9 is a circuit diagram of the difference detector shown in block form in FIGURE 8.

An implementation of a suitable comparator circuit for use in the embodiments of FIGURES 3 and 4 is shown in FIGURE 7, and is comprised of difference circuit 109, analog OR gate 122 and difference amplifier 126. (See FIGURE 4.)

Difference amplifiers 109 and 126 each comprises a pair of transistors 190 and 192, and 194 and 196, respectively, and associated bias circuitry to assure operation of all of the transistors within their regions of linear conductivity, in known fashion. In circuit 109, the input to transistor 190 is provided on lead 116 from output terminal 188 of a sample-and-hold circuit such as shown in FIGURE 6, which would serve as the memory circuit 104, while the input from transistor 192 would be provided from the output of another circuit as shown in FIGURE 6 along path 110 from the output of memory circuit 102 (see FIGURE 4). As is well known, if the transistors are properly balanced, then an output signal may be derived from each of the two transistors—representative in each case of the difference between the input to that transistor and the input to the other transistor. Accordingly, collector terminal 198 of transistor 190 provides a signal equal to the difference between the waveform on lead 116 and that applied on lead 110, while collector 200 of transistor 192 provides a signal equal to the difference between the signal on lead 110 and that on 116. These signals (which for purposes of explanation may be assumed to be representative of waveforms H and G, respectively, shown in FIGURE 4) are of equal amplitude and opposite polarity, as may be understood. The signals are provided to a suitable pair of diodes 202 and 204 connected in common to base 206 of an emitter-follower circuit 208. This configuration serves in well-known fashion as an analog OR gate to pass the most positive of the two input signals to path 124 (see FIGURE 2), connected to emitter 210 of transistor 208. This output signal, which may be represented by waveform I in FIGURE 4, is provided as one input to difference amplifier 126. The second input to difference amplifier 126 is provided on lead 128 (FIGURE 3) as a signal $\Delta V$, which represents the threshold of resolution for the redundancy-elimination circuit (see waveform J in FIGURE 4). An output 130 is connected to collector terminal 212 of transistor 196, to provide a waveform representative of the difference between waveform I and waveform J—provided at the input of transistors 194 and 196, respectively—which is the waveform labeled K in FIGURE 4. As may be understood, proper selection of the value of $\Delta V$ will determine which portions of waveform I will result in a positive value for waveform K, which positive value (see FIGURE 3) causes a positive output from the Schmitt trigger circuit 132.

Referring now to FIGURES 8 and 9, there are shown block diagrams of a PPM encoder suitable for use with the present invention. As in FIGURE 8, the PPM encoder may include a ramp generator 220 under the control of the system clock, and a difference amplifier 222 provided with the ramp signal and with the information signal to be encoded (as by signal path 114 in FIGURE 3), and a pulse generator 234. The difference detector 222 may comprise a three-transistor circuit such as shown in FIGURE 9. The circuit is biased so that transistor 224 is normally saturated. Base of transistor 224 is provided with the voice signal to be encoded on lead 114 by means of voltage divider 226 comprising resistors 228 and 230, the values of which are selected so that transistor 224 will be biased into its cut-off state when the voltage provided by the ramp generator is greater than or equal to the voltage on lead 114 but will remain saturated otherwise. Accordingly, it may be seen that if the minimum value of the ramp waveform appearing at terminal 223 is less than the minimum value of the sampled voice signal appearing on lead 114, then transistor 224 will always be saturated for an initial portion of the period of the ramp. However, at the time the two input waveforms reach the same value, transistor 224 will cease to conduct, and the value of the signal appearing on output lead 142 will jump to a constant positive value determined by the operating voltage V and the biasing circuitry employed. The output on lead 142 will remain high as long as the value of the ramp waveform exceeds that of the sampled voice input on lead 114.

Figure 10:
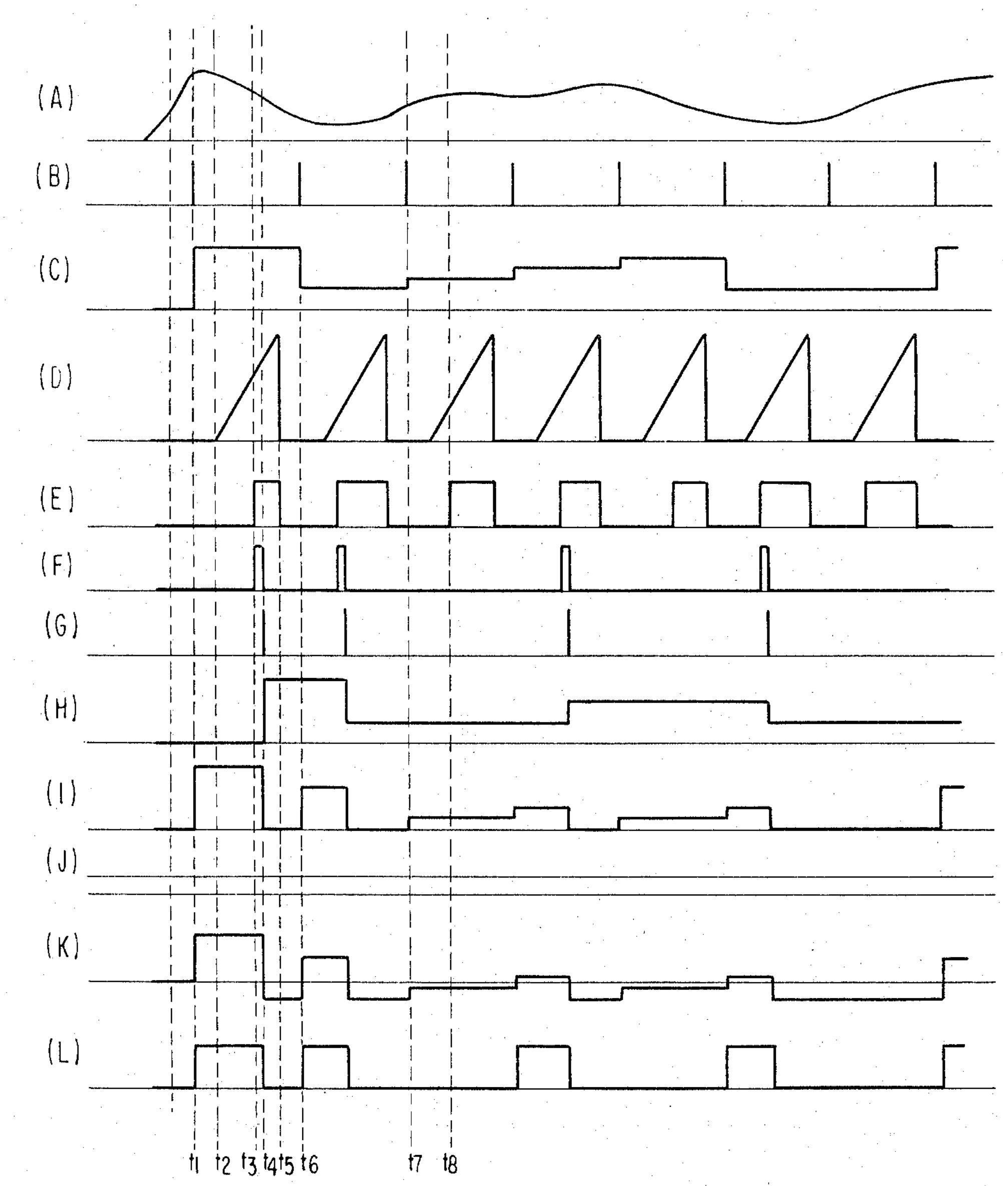
FIGURE 10 is a diagram showing various waveforms appearing in the system of FIGURE 8.

Referring now to FIGURE 10, the above-described operation will be explained in more detail. Assume that the waveform C is provided on lead 114 as a voice or information waveform to be sampled, and that waveform D is provided at terminal 223 as the output of ramp generator 220. As previously explained, the so-called deviation period of the pulse-position modulation system is determined as a compromise between system resolution and sensitivity to noise. Having chosen this deviation period, a clock signal provided to ramp generator 220 will determine the duration of the rising portion of the ramp signal whereby the length of the deviation period is fixed. For example, if a sampling period runs between times $t_1$ and $t_6$, a suitable deviation period may be chosen to run from time $t_2$ to time $t_5$. As shown in FIGURE 10, the deviation period is somewhat exaggerated since, as a practical matter, the deviation period is usually less than 50 percent of the total sampling period.

From waveforms C, D and E, it may be seen that between times $t_2$ and $t_3$ the value of ramp waveform D is less than that of the sampled input waveform as shown in waveform C. However, at time $t_3$ the ramp level and the input level on lead 114 (FIGURE 9) become equal and transistor 224 is cut off. This is shown in waveform E, and corresponds to a rapid rise in the waveform at time $t_3$.

At time $t_5$, which corresponds to the end of the deviation period, the ramp waveform goes to zero, whereby the base-to-emitter junction of transistor 224 is forward biased, and the transistor again begins to conduct heavily. Thus the collector voltage appearing on lead 142 is returned substantially to zero.

Thus it may be seen that for each succeeding sampling and deviation period there will be provided a pulse in waveform E, the duration of which is proportional to the amplitude of waveform C during that period—i.e., a pulse-width modulated waveform.

Referring again to FIGURE 8, if it is desired to convert the pulse-width modulated waveform into true pulse-position modulation, this may be accomplished by means of a suitable pulse generator 234 connected to the output of difference detector 222. Pulse generator 234 may be of any of a number of well-known types and will be arranged to respond to the leading edge of each of the pulses in waveform E to produce a single narrow pulse of accurately determined width. For example, the pulse generator may include an RC circuit acting as a differentiator, connected to a monostable multivibrator which responds to the positive spikes provided by the differentiator (corresponding to the leading edge of each of the pulses in waveform E) to produce a single output pulse of controlled duration.

An alternative method of pulse width control which may be incorporated into a system such as that of FIGURE 4, is shown in FIGURE 11. In this circuit (numbered to correspond to FIGURE 4), the output of clock 144' is provided directly by means of lead 154' to memory circuit 102, and in the provision of the output of control gate 138 by means of lead 136' to a delay circuit 156. The output of delay circuit 156 is provided by means of lead 150' directly to the enabling input of the memory circuit 104.

The operation of the circuit of FIGURE 11 may be understood by a further reference to FIGURE 10. As will be recalled, during each sampling period encoder 112' provides an output pulse to control gate 138 which is passed therethrough to the transmitter under the control of a signal appearing on lead 134. Assuming that before time $t_1$ memory circuit 104 contains a signal of zero level, then it may be seen that after time $t_1$ waveform I (which represents the magnitude of the difference between the current sample and the most recently transmitted sample) will be equal to the value of the most recent sample. Accordingly, waveform K is simply a positive signal having an amplitude equal to that of signal I minus the constant threshold level of signal J, and waveform L is a positive pulse generated by trigger circuit 132 in response to the signal on lead 130.

Signal L, which is provided over lead 134 to control gate 138, permits the passage through the gate of the E waveform beginning at time $t_3$. This signal is provided to delay circuit 156, which provides an output pulse a short time later at time $t_4$. This signal (waveform G) is provided along lead 150' as the sampling signal to memory circuit 104. Accordingly, at this time, memory 104 stores the signal present in memory 102, since a code corresponding to this signal is being transmitted at that time. However, the new value of the signal present in waveform H causes the value of waveform I to go to zero, since the same signal is present in memory 104 as memory 102. Thus, waveform K goes negative by an amount equal to the threshold level of waveform J, waveform L goes to zero, and the signal appearing on lead 142 from encoder 112' is inhibited. Therefore, the output pulse (waveform F) is a pulse which begins at time $t_3$, corresponding to the leading edge of the pulse-width modulated waveform E, and ends a short time later—which time is determined primarily by the value of the delay provided by delay circuit 156.

As will be understood, when the value of the A waveform at the beginning of a sample period differs by less than the threshold amount from its value at the beginning of the previous sampling period, the output during that period should be inhibited. Accordingly, the sample at time $t_7$ being insufficiently different from that of time $t_6$, it may be seen that the difference between waveforms C and H (waveform I) causes the difference between waveforms I and J to produce a negative signal on lead 130 and the output of trigger circuit 132 to remain zero. Accordingly, gate 138 is disabled, and the pulse in waveform F appearing at time $t_8$ passes neither to the transmitter nor to delay circuit 156. There being no input to delay circuit 156, memory circuit 104 is not operated during this time period, whereby no new pulse is stored therein.

Accordingly, it may be seen that the apparatus of FIGURE 11 may be advantageously employed as an alternative to that shown in FIGURE 4, if desired.

Various embodiments of this invention have been shown and described, but it should be recognized that a large number of other variations are possible within the scope of the teachings of this invention. For example, other suitable forms of digital or analog encoding may be employed, as will clearly be understood in light of this disclosure. Further, while specific circuitry has been shown and described in connection with the embodiments of this invention, it should be recognized that other functionally equivalent circuitry employing vacuum tubes, as well as various solid-state devices, may be substituted if desired.

Thus, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a communication system, means for reducing the degree of redundancy in the information to be transmitted comprising: means to sample the information to be transmitted; a first memory to store signals representative of the information samples; a second memory to store information representative of the most recently transmitted information; comparator means to provide an indication when the contents of the first and second memories differ by more than a predetermined amount; transmitter means; and means responsive to an indication of the predetermined difference to provide the transmitter means and the second memory with signals representative of the contents of the first memory whereby the information stored in the first memory may be transmitted and information representative of the transmitted information may be stored in the second memory.

2. The system of claim 1 where the means responsive to an indication from the comparator includes first gating means connected to the first memory for selectively passing a signal to the transmitting means.

3. The system of claim 2 wherein the sampling means includes encoding means responsive to the instantaneous value of the information waveform periodically to generate a code signal for storage by the first memory circuit; where the first and second memories comprise shift registers to store the code signals; and where the comparator means includes means to compare the contents of the shift registers on a bit-by-bit basis.

4. The system of claim 3 where each code signal is a member of a finite set of code signals, the member of the set chosen to be generated being the one most nearly representative of the instantaneous value of the sampled information.

5. The system of claim 4 wherein the second shift register is selectively connectable to the first shift register; where the comparator means includes means to generate a control signal when contents of the shift registers differ by more than a predetermined number of bits; and where the gating means responds to the generated control signal to provide the transmitter means with the signal present in the first shift register, and causes the second shift register to be connected to the first shift register whereby information representative of that stored in the first shift register is transferred to the second shift register.

6. The system of claim 2 where the first gating means includes means responsive to the signal in the first memory to generate an analog code signal representative thereof; and an enabling circuit responsive to the indication from the comparator to pass the code signal to the transmitter.

7. The system of claim 6 further including a clock signal generator; and gating means connected to the clock and to the second memory, responsive to the coincidence of an indication from the comparator and a clock signal to initiate the transfer of information into a second memory.

8. The system of claim 7 including a delay circuit connected to the clock signal generator and the sampling means, whereby the first memory is operated to store information representative of a new sample shortly after the occurrence of the clock signal provided to the second gating means.

9. The system of claim 2 further including a clock signal generator connected to the sampling means for periodically initiating the storage of new information in the first memory, and a delay circuit connected between the second memory and the output of the first gating means whereby, responsive to the initiation of a signal to the transmitter, there is provided a gating signal to the second memory a predetermined time later to initiate the storage therein of the same information as that stored in the first memory, causing both the indication from the comparator and the output of the first gating means to cease.

10. The system of claim 9 where the comparator includes means responsive to the contents of the first and second memories to provide a first difference signal representative of the difference between the contents of the first and second memories, and a second difference signal representative of the difference between the contents of the second and first memories; means responsive to the first and second difference signals, to provide a third signal representative of the most positive of the first and second difference signals, an indication of the absolute value of the difference between the contents of the first and second memories; and a subtraction circuit to provide a fourth signal representative of the difference between the third signal and a reference signal, a positive value of the fourth signal being representative of at least the predetermined difference between the two memory signals; and trigger means responsive to a positive value of the fourth signal to provide an enabling signal of predetermined amplitude, and responsive to a zero or negative value of the fourth signal to cause the enabling signal to assume a zero value.

11. Means to reduce the redundancy of an information waveform comprising: means to sample the information waveform, a first memory to store signals representative of the information samples; a second memory to store a signal representative of the most recent nonredundant sample; comparator means to provide an indication when the contents of the first and second memories differ by more than a predetermined amount, such predetermined difference being an indication of the nonredundancy of the information in the first and second memories; and means responsive to an indication from the comparator to provide a signal representative of the contents of the first memory as a system output, and to cause the storage in the second memory of a signal representative of the information in the first memory.

12. The system of claim 11 where the means responsive to an indication from the comparator includes means responsive to the signal in the first memory to generate a code signal representative thereof and a gating circuit responsive to the indication from the comparator to provide as the system output, the signal from the code generator.

13. The system of claim 12 further including a clock signal generator; and a second gating means connected to the clock and to the second memory, responsive to the indication from the comparator to initiate the transfer of information into the second memory.

14. The system of claim 13 including a delay circuit connected to the clock generator and the sampling means, whereby the first memory is operated to store information representative of a new sample shortly after the occurrence of the clock signal provided to the second gating means.

15. The system of claim 14 where the comparator includes means responsive to the contents of the first and second memories to provide a first difference signal representative of the difference between the contents of the first and second memories, and a second difference signal representative of the difference between the contents of the second and first memories; means responsive to the first and second difference signals, to provide a third signal to the most representative of the absolute value of the difference between the contents of the first and second memories; a subtraction circuit to provide fourth signal representative of the difference between the absolute value signal and a reference signal, a positive value of the fourth signal being representative of non-redundancy of the information in the first and second memories; and means responsive to a positive value of the fourth signal to provide an enabling signal of predetermined non-zero value, and in response to a zero or negative value of the fourth signal, to provide an enabling signal of a zero value.

16. The system of claim 11 where the sampling means includes encoding means responsive to the instantaneous value of the information waveform for periodically generating a code signal for storage by the first memory circuit; where the first and second memories comprise shift registers to store the code signals; and where the comparator means includes means to compare the contents of the shift registers on a bit-by-bit basis, and to provide a control signal if the contents of the memories differ by more than a predetermined number of bits.

17. The system of claim 16 where the means responsive to an indication from the comparator includes a gating circuit connected to the first shift register and responsive to the control signal to provide as a system output, the signal stored in the first shift register.

18. A communication system comprising: means to sample an incoming information waveform; first memory means to store signals representative of the information samples; a second memory means selectively connectable to the first memory means; means to compare the contents of the first and second memories and to generate a control signal when the memory contents differ by more than a predetermined amount; transmitter means; and means responsive to a control signal to provide the transmitter means with a signal representative of the contents of the first memory and to cause the second memory to be connected to the first memory means whereby the information stored in the first memory may be stored in the second memory.

19. In a communication system including a source of an information waveform, means to encode the information, and a transmitter for transmitting signals representative of the encoded information: first means for periodically sampling and storing a signal representative of the instantaneous value of the information waveform; second means to store signals representative of the values of previous samples of the information waveform; means to compare the values of the signals stored by the first and second means and to provide an indication of the difference therebetween; and means responsive to a predetermined difference to provide the transmitter and the second means with signals representative of the signal stored in the first means so that the signal stored in the second means is representative of the most recently transmitted sample.

References Cited

UNITED STATES PATENTS

| | | | |
|---|---|---|---|
| 3,173,092 | 3/1965 | Meschi | 325—38.1 |
| 3,213,268 | 10/1965 | Ellersick | 179—15.55 X |

ROBERT GRIFFIN, *Primary Examiner.*

J. T. STRATMAN, *Assistant Examiner.*